Patented Dec. 21, 1943

2,337,425

UNITED STATES PATENT OFFICE 2,337,425

MANUFACTURE OF TRIAMINO-DIPHENYL-NAPHTHYL-METHANE DYESTUFFS

Harvey Irvin Stryker, Carneys Point, N. J., assignor to E. I. du Pont de Nemours & Company, Wilmington, Del., a corporation of Delaware No Drawing. Application October 21, 1941, Serial No. 415,948

7 Claims. (Cl. 260—388)

This invention relates to an improved method of manufacture of basic dyestuffs of the triaryl methane series, and more particularly to an improved method for the manufacture of basic dyestuffs of the triamino-diphenyl-naphthyl-methane series.

It is an object of this invention to provide a simple, safe and economical method for the manufacture of basic dyestuffs of the above series. It is a further object of this invention to provide a process for manufacturing these colors in improved yield and in a state of high quality. Additional objects of this invention will appear as the description proceeds.

Colors of the triamino-diphenyl-naphthyl-methane series are generally manufactured in the art by a process which comprises condensation of a tetra-alkyl-diamino-benzophenone with an alkyl-, aralkyl- or aryl- substituted alpha-naphthylamine, using phosphorus oxychloride as a condensing agent. Toluene is generally employed as a diluent, and the standard practice is illustrated by the following procedure, applied to the making of Victoria Blue B (color index #729) and taken from Fierz-David and Blangey, Farbenchemie, ed. of 1938, page 247:

One mole of Michler's ketone (tetra-methyl-diamino-benzophenone) is mixed with 25% of its weight of toluene and with one mole of phenyl-α-naphthylamine. One mole of phosphorus-oxychloride is then added and the mass is stirred until it becomes stiff. It is then boiled up with water to destroy the POCl₃-complex, and caustic soda is added just sufficient to neutralize the HCl liberated without precipitating the color base. Boiling is continued until the toluene is steam-distilled away, the mother-liquor is decanted off, and the residual color, which is now in the form of chloride, is dried.

Although the authors state that the yield is quantitative, the yield in actual practice is very far from this ideal. Apparently the authors were considering the entire weight of the crude product, without reference to its purity. When the latter factor is taken into account, the yield of actual dyestuff seldom exceeds 65% of theory.

In addition to the low yield, the above process has the disadvantage of difficult handling. Toluene is not a good solvent for the reactants in this process. The authors' suggested ratio of 25% (based by weight on the quantity of ketone employed) is about the maximum that will blend with the reaction mass. If larger quantities of toluene are employed, the excess floats over the surface of the mass, without mixing with the same. As a result, the reaction mass becomes stiff at the end of the reaction and cannot be stirred. It is also difficult to handle after the reaction is finished. Finally, the use of toluene, which boils at about 110° C. often causes the reaction mass to spatter, which increases immensely the hazard to life and health of the operators, inasmuch as phosphorus-oxychloride fumes are very corrosive and noxious.

Now I have found that all the above difficulties can be neatly and efficiently overcome by the selection of a higher-boiling aromatic solvent for the reaction mass. Ortho-dichlorobenzene has been found by me to give the best results, although mono chlorobenzene and solvent naphtha (mixed xylenes) also give some improvement. Mixtures of these in various proportions or mixtures of ortho-dichlorobenzene with toluene may also be used.

The first advantage of the selection of one of the above solvents, especially o-dichloro-benzene, is that it has a much higher solvent power for the reactants. Consequently, much larger proportions thereof may be employed, and when used in the ratio of 1:1 (based on the weight of the ketone), it gives a fluid reaction mass throughout the process, which facilitates handling of said mass without hazard.

Another immediate advantage is that the higher boiling point of o-dichlorobenzene eliminates spattering and the resultant spreading of noxious fumes.

But a third and most surprising effect is a very large increase in the yield of dyestuff, based on the quantity of final purified product.

Additional important and unforeseen advantages have been observed from this selection. Thus, it had been observed in the prior, standard process that the use of purified initial materials (tetra-alkyl-diamino-benzophenone and N-substituted alpha-naphthylamine) often resulted in a solidification of the reaction mass, which would prevent further reaction. But when o-dichlorobenzene is employed as solvent, the mass stays fluid to the end, and the initial materials may be selected of the highest purity, resulting in a final product of higher quality and greater yield.

As a secondary feature of this invention, I may combine the above improved method of synthesis with a special method of purification whereby a product free from organic impurities is obtained. This method consists essentially of dissolving the synthesized dyestuff, after decomposition of the POCl₃-complex and separation from water-soluble by-products, in an aqueous acid in which the dyestuff has very high solubility compared to aqueous hydrochloric acid. Acetic and phosphoric acids are two acids answering satisfactorily the above requirement. The aqueous solution of the dyestuff, which is now in the form of acetate or phosphate respectively, is separated from any insoluble matter in any convenient manner. For instance, if the impurities are definitely solid, they may be removed by filtration. If they are of a tarry, difficultly filterable nature, separation may be effected by adding an organic solvent, such as benzene, toluene, or o-dichloro-benzene, to dissolve the impurities. The two-phase mixture is then allowed to separate into layers, and the aqueous phase is removed and treated to salt out the dyestuff in the form of hydrochloride, phosphate, or any other convenient salt.

The product thus obtained is characterized by exceptional brilliance and tinctorial strength, indicative of high purity, and may be used for blueing bleached paper or for the manufacture of carbon paper, typewriter ribbon, hectograph inks, or for any purpose wherein high-grade dyestuffs of the Victoria-Blue series are generally employed.

Without limiting my invention to any particular procedure, the following examples are given to illustrate my preferred mode of operation. Parts mentioned are by weight.

Example 1

To a mixture of 135 parts of Michler's ketone, 95 parts N-monoethyl-alpha-naphthylamine and 130 parts ortho-dichloro benzene, are added slowly 90 parts of phosphorus oxychloride at such a rate that the temperature rises to 80–85° C. The reaction mass is then heated at 100–105° C. for one and one-half hours to complete the condensation. At the end of this time, the mass is still quite fluid and may be readily transferred to another vessel. The reaction mass may now be worked up in any suitable manner to produce ultimately a water-soluble salt of the dyestuff, such as the hydrochloride or phosphate, or to produce the water-insoluble base.

Example 2

To a mixture of 105 parts of Michler's ketone, 84 parts N-phenyl-alpha-naphthylamine, and 160 parts of ortho-dichlorobenzene are added slowly 76 parts of phosphorus-oxy-chloride at such a rate that the temperature rises to 80–85° C. The reaction mass is then heated at 90–100° C. for three hours to complete the condensation. At the end of this time the mass is still quite fluid. The reaction mass is now discharged into an excess of 15% aqueous sodium hydroxide. The mixture is heated to the boil and steam distilled until the distillate no longer shows ortho-dichloro benzene. The crude Victoria Blue B base is filtered off and washed with water until free of water soluble salts. An amount of the crude base equivalent to 52.5 parts of Michler's ketone is then added to a solution of 90 parts of glacial acetic acid in 1500 parts of water and heated to boiling. After boiling one hour, 5 parts of infusorial earth or other filter-aid are added, and the solution is stirred one hour at 85–90° C. The solution is then filtered. To this filtrate, is added 110 parts of 20% hydrochloric acid and 238 parts of 25% sodium chloride brine. Victoria Blue B, hydrochloric acid salt, separates as a tar and is dried.

Example 3

Tetraethyl diamino benzophenone was condensed with N-phenyl-alpha-naphthylamine, using phosphorus oxychloride in ortho-dichloro benzene in amounts equivalent to those of Example 1. The condensation mass obtained from 175 parts of the benzophenone was added to a solution of 105 parts sodium hydroxide in 1200 parts water and boiled for two hours. After cooling, the crude color base was filtered off and washed thoroughly with cold water.

The crude base was added to a mixture of 3000 parts water, 260 parts toluene, and 210 parts of aqueous phosphoric acid (65%). This mixture was heated at 80–85° C. for two hours and the upper toluene layer was separated and discarded. A second portion of toluene was added, and the mixture was heated one hour at 80–85° C. The upper toluene layer was separated and discarded. Sodium chloride was now added to the aqueous layer to precipitate the hydrochloride salt of the dyestuff.

Example 4

The crude base obtained from 52.5 parts of Michler's ketone as in Example 2 is extracted with 70 parts of 65% phosphoric acid in 1500 parts water at 95–100° C. for 1 hour, cooled to 85–90° C. and filtered to remove the impurities. The filtrate is added during one hour to 2500 parts water containing 232 parts of 30% aqueous sodium hydroxide. Victoria Blue B base precipitates and is filtered off, washed, and dried.

Example 5

To a mixture of 165 parts of tetra-ethyl-di-amino-benzophenone and 165 parts ortho-dichlorobenzene are added slowly 90 parts of phosphorus-oxy-chloride at such a rate that the temperature rises to 70–75° C. The reaction mass is heated one-half hour at this temperature. While maintaining this temperature, 95 parts of N-mono-ethyl-alpha-naphthylamide are then added slowly. Finally, the reaction is completed by an additional half-hour's heating at 70–75° C.

The reaction product may now be recovered by any suitable method.

It will be understood that the above examples are merely illustrative, and that the details of procedure may be varied within wide limits within the skill of those engaged in this art. Thus, the amount of solvent, time of reaction and temperature may be varied widely.

The proportion of o-dichloro-benzene may be varied from 0.5 to 5 parts by weight as compared to the weight of the ketone. For practical purposes a ratio of about 1:1 gives best results.

The temperature of the reaction may vary from 60 to 110° C., with the optimum about 100° C. The time of heating for completing the reaction may vary from one to three hours, although longer or shorter periods may be employed with some degree of success, say from 0.5 to 8 hours.

For decomposing the POCl₃-complex, a limited quantity of alkali, for instance caustic soda or potash, may be employed, so as to leave the dyestuff in the form of hydrochloride, in which case the solvent is removed by steam distillation. But if desired, an excess quantity of alkali may be employed, to produce the color in the form of base, which may then be separated from the solvent simply by filtration. Alternatively, additional o-dichloro-benzene may be added at this stage to dissolve the crude color base, and the resulting solution may be separated from the aqueous layer and then treated with acetic or phosphoric acid, as in the subsequent steps of the above-described procedure. Or again, the crude color base may be extracted with a solvent in a continuous extractor.

The treatment with aqueous acetic or phosphoric acid may be applied to the separated crude color in solid form, or to a solution thereof in a solvent such as o-dichloro-benzene. In the latter event, admixture of the aqueous acid results in a transfer of the dyestuff from the organic liquid phase into the aqueous phase, while the organic impurities stay in the organic phase.

After removal of impurities, the solution of color may be treated with an alkali to form the base at any desired temperature up to the boil, and at any desired concentration. Alternatively, after removal of the impurities, the solution of the color may be treated with hydrochloric acid or one of its common soluble salts (or both) to precipitate, substantially, the hydrochloride salt of the dyestuff. Or again, sodium phosphate may be added to precipitate the phosphate salt.

The improved process of this invention may be applied to any color of the triamino-diphenyl-naphthyl-methane series. Of these, the most common in the trade are made from tetramethyl-diamino-benzophenone or tetraethyl-diamino-benzophenone with the following secondary alpha-naphthylamines: monoethyl alpha-naphthylamine, phenyl alpha-naphthylamine, para-tolyl alpha-naphthylamine, and para-ethoxy or methoxy alpha-naphthylamines. Mixtures of the benzophenones and the secondary alpha-naphthylamines may be used.

In all cases, the resulting dyestuffs represent a very distinct improvement over those manufactured by the prior art processes, in shade, brightness, strength and solubility. The improvement in manipulation and safety of the process have already been mentioned.

I claim:

1. In the process of producing a triamino-diphenyl-naphthyl-methane dyestuff by reacting together a tetra-alkyl-diamino-benzophenone, an N-mono-substituted alpha-naphthylamine and phosphorus oxychloride, the improvement which comprises effecting the reaction in a liquid organic medium consisting predominantly of ortho-dichloro-benzene.

2. A process as in claim 1, the quantity of ortho-dichloro benzene being substantially equal in weight to the quantity of tetra-alkyl-diamino-benzophenone employed.

3. In the process of producing a triaryl-methane dyestuff by reacting together tetraethyl-diamino-benzophenone, N-monophenyl-alpha-thylamine and phosphorus oxychloride, the improvement which consists of carrying out the reaction in a liquid organic medium consisting predominantly of ortho-dichloro benzene.

4. In the process of producing a triaryl-methane dyestuff by reacting together tetraalkyl-diamino-benzophenone, N-monophenyl-alpha-naphthylamine and phosphorus oxychloride, the improvement which consists of carrying out the reaction in a liquid organic medium consisting predominantly of ortho-dichloro benzene.

5. In the process of producing triaminodiphenylnaphthylmethane dyestuff by reacting a tetraalkyldiaminobenzophenone with an amine from the group consisting of alkyl-substituted and aryl-substituted alpha-naphthylamine using phosphorus oxy-chloride as a condensing agent, the improvement which comprises effecting the reaction in ortho-dichlorobenzene at a temperature materially above 60° C.

6. In the process for producing Victoria Blue R by reacting 4,4'-bis(dimethylamino)-benzophenone with N-ethyl-alpha-naphthylamine and a condensing agent, the improvement which comprises carrying out the reaction at a temperature materially above 60° C. in ortho-dichlorobenzene.

7. In the process of producing Victoria Blue B by reacting 4,4'-bis(dimethylamino)-benzophenone with N-phenyl-alpha-naphthylamine and a condensing agent, the improvement which comprises carrying out the reaction at a temperature materially above 60° C. in ortho-dichlorobenzene.

HARVEY IRVIN STRYKER.

CERTIFICATE OF CORRECTION.

Patent No. 2,337,425.                                  December 21, 1943.

HARVEY IRVIN STRYKER.

It is hereby certified that error appears in the printed specification of the above numbered patent requiring correction as follows: Page 3, second column, line 12-13, claim 3, for "N-monophenyl-alpha-thylamine" read --N-monoethyl-alpha-naphthylamine--; and that the said Letters Patent should be read with this correction therein that the same may conform to the record of the case in the Patent Office.

Signed and sealed this 14th day of March, A. D. 1944.

Leslie Frazer (Seal)                Acting Commissioner of Patents.